US007039587B2

(12) United States Patent
Chaudhari et al.

(10) Patent No.: US 7,039,587 B2
(45) Date of Patent: May 2, 2006

(54) SPEAKER IDENTIFICATION EMPLOYING A CONFIDENCE MEASURE THAT USES STATISTICAL PROPERTIES OF N-BEST LISTS

(75) Inventors: Upendra V. Chaudhari, Briarcliff Manor, NY (US); Jiri Navratil, White Plains, NY (US); Ganesh N. Ramaswamy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 10/039,258

(22) Filed: Jan. 4, 2002

(65) Prior Publication Data

US 2003/0130844 A1    Jul. 10, 2003

(51) Int. Cl.
*G10L 15/00*    (2006.01)

(52) U.S. Cl. .................... 704/246; 704/250
(58) Field of Classification Search ............. 704/246, 704/250
See application file for complete search history.

(56) References Cited

U.S. PATENT DOCUMENTS 5,913,192 A * 6/1999 Parthasarathy et al. ..... 704/256
6,411,930 B1 * 6/2002 Burges ........................ 704/240

OTHER PUBLICATIONS

U.V. Chaudhari et al., "Transformation Enhanced Multi-Grained Modeling for Text-Independent Speaker Recognition", ICSLP 2000, pp. II.298-II.301.
D.A. Reynolds, "Experimental Evaluation of Features for Robust Speaker Identification", IEEE Trans. on Speech & Audio Processing, vol. 2, No. 4, pp. 639-643, 1994.
D.A. Reynolds et al., Robust Text-Independent Speaker Identification Using Gaussian Mixture Speaker Models, IEEE Trans. on Speech and Audio Processing, vol. 3, No. 1, pp. 72-83, Jan. 1995.

* cited by examiner

*Primary Examiner*—Daniel Abebe
(74) *Attorney, Agent, or Firm*—Ference & Associates

(57) ABSTRACT

Methods and arrangements for facilitating speaker identification. At least one N-best list is generated based on input speech, a system output is posited based on the input speech, and a determination is made, via at least one property of the N-best list, as to whether the posited system output is inconclusive.

17 Claims, 3 Drawing Sheets

SPEAKER IDENTIFICATION EMPLOYING A CONFIDENCE MEASURE THAT USES STATISTICAL PROPERTIES OF N-BEST LISTS

FIELD OF THE INVENTION

The present invention generally relates to speaker identification systems, particularly, in which the speech of a given individual is analyzed and the identity of the individual is determined.

BACKGROUND OF THE INVENTION

Speaker identification systems have been developed for years, and efforts continue to be made at improving upon prior versions. Several publications which provide but a small representation of the current state of the art include: D. A. Reynolds, "Experimental Evaluation of Features for Robust Speaker Identification", IEEE Transactions on Speech and Audio Processing, Vol. 2, No. 4, pp. 639–643, 1994; D. A. Reynolds and R. C. Rose, "Robust Text-Independent Speaker Identification Using Gaussian Mixture Speaker Models", IEEE Transactions on Speech and Audio Processing, Vol. 3, No. 1, pp. 72–83, January 1995; and U. V. Chaudhari, J. Navratil, S. H. Maes, and Ramesh Gopinath "Transformation Enhanced Multi-Grained Modeling for Text-Independent Speaker Recognition", ICSLP 2000, pp. II.298–II.301.

Among the disadvantages observed in connection with conventional speaker identification systems is that such systems are generally not configured for being able to determine when a system result is inconclusive. Accordingly, a need has been recognized in connection with overcoming such disadvantages.

SUMMARY OF THE INVENTION

In accordance with at least one presently preferred embodiment of the present invention, a speaker identification system is contemplated which is able to statistically model and evaluate whether a system result is inconclusive. In accordance with a preferred embodiment, an N-best list is analyzed and a confidence measure is obtained using statistical properties of the N-best list.

In summary, the present invention provides, in one aspect, an apparatus for facilitating speaker identification, said apparatus comprising: an arrangement for accepting input speech; an arrangement for generating at least one N-best list based on the input speech; an arrangement for positing a system output based on the input speech; and an arrangement for ascertaining, via at least one property of the N-best list, whether the posited system output is inconclusive.

Another aspect of the present invention provides a method of facilitating speaker identification, said method comprising the steps of: accepting input speech; generating at least one N-best list based on the input speech; positing a system output based on the input speech; and ascertaining, via at least one property of the N-best list, whether the posited system output is inconclusive.

Furthermore, the present invention provides, in an additional aspect, a program storage device readable by machine, tangibly embodying a program of instructions executable by the machine to perform method steps for facilitating speaker identification, said method comprising the steps of: accepting input speech; generating at least one N-best list based on the input speech; positing a system output based on the input speech; and ascertaining, via at least one property of the N-best list, whether the posited system output is inconclusive.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Throughout the present disclosure, various terms are utilized that are generally well-known to those of ordinary skill in the art. For a more in-depth definition of such terms, any of several sources may be relied upon, including Reynolds, Reynolds et al., and Chaudhari et al., all supra.

Figure 1:
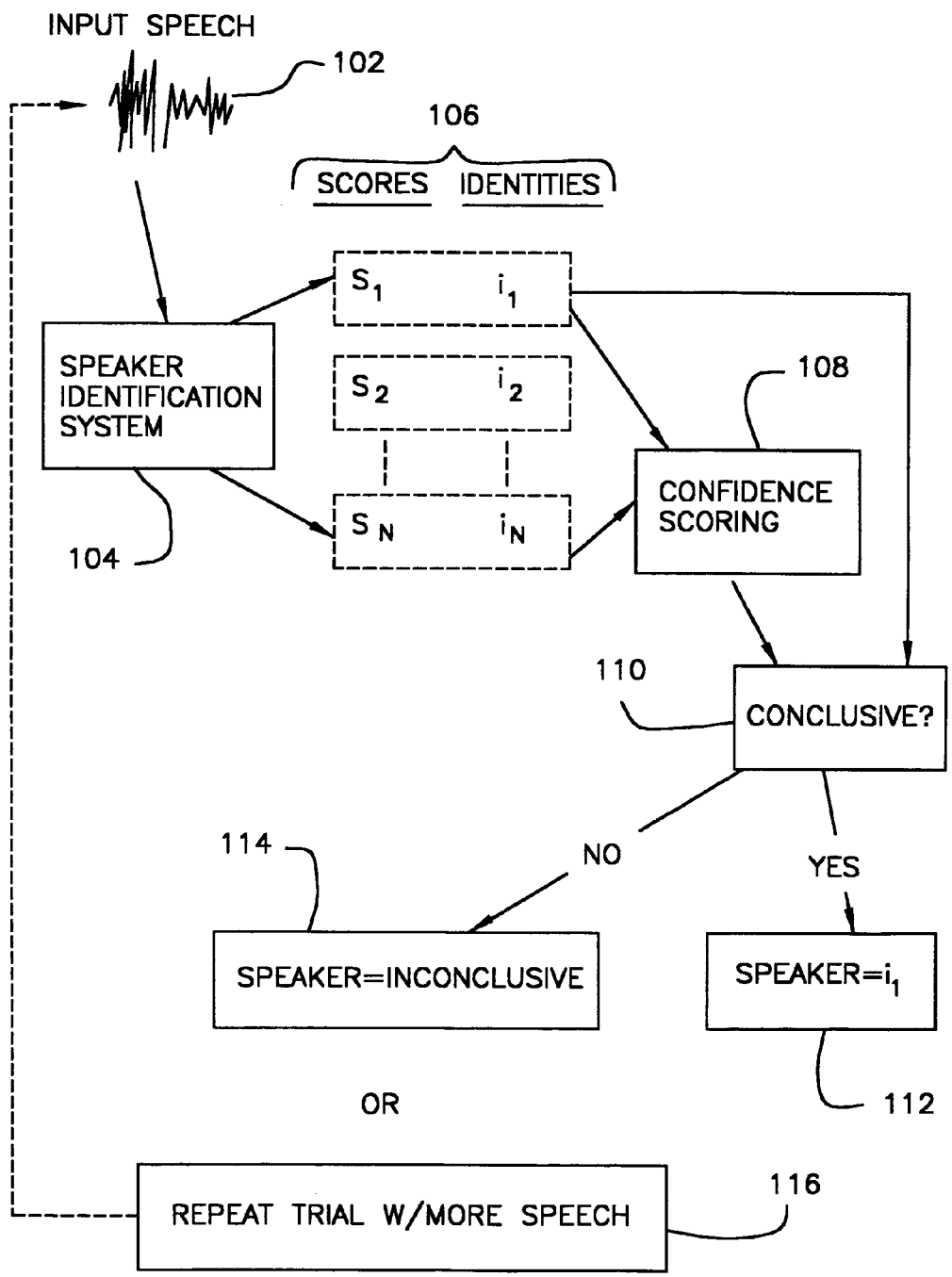
FIG. 1 schematically illustrates a system of confidence-based speaker identification.

FIG. 1 schematically illustrates a system of confidence-based speaker identification in accordance with an embodiment of the present invention. Input speech (102) is input into the speaker identification system 104. An N-best list 106 is then preferably generated, and sorted so that the first candidate is the one associated with the best score and the Nth candidate is the one with the $N^{th}$ lowest score, i.e. the worst score among the top N candidates. In general, there will be a large population of enrolled speakers with size $N_p \gg N$ and a score will be generated for all $N_p$ speakers. The N-best list contains the N top scoring speakers (candidates). An objective will be to examine these lists and determine the level of confidence the system has as to the correctness of the best scoring candidate (108). Based on this measure, as queried at 110, either an answer is given (112) or the trial is determined to be inconclusive (114/116). If the trial is determined to be inconclusive, a determination is made as to whether the speaker is inconclusive on the whole (114) or if a further trial ("repeat trial") with more input speech from the same speaker is warranted (116). When more than one identification system is used, each analyzes the speech and the answer of the system with the highest confidence is used. (In some instances, it is desirable to use more than one identification system to avoid being limited to the particular type or range of scores generated, the statistical methods used on the N-best lists are not dependent on such parameters.)

Figure 2:
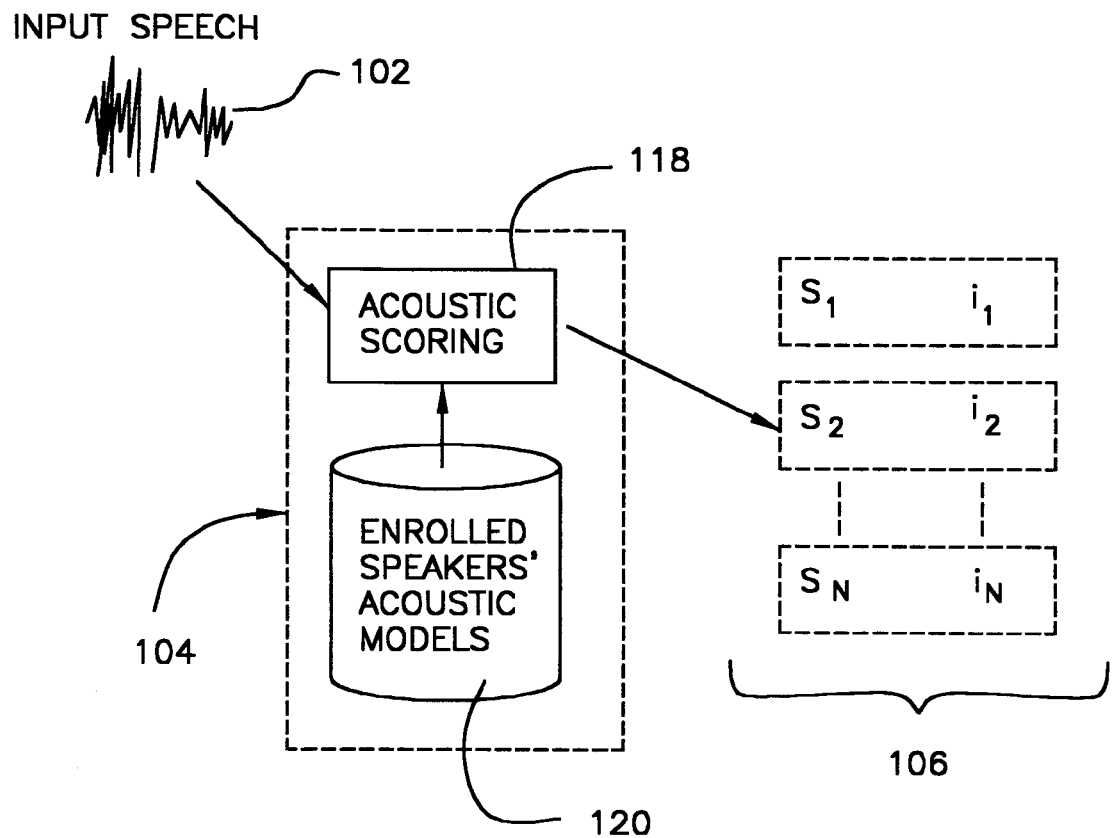
FIG. 2 schematically illustrates the generation of an N-best list in the context of FIG. 1.

With reference to FIG. 2, in accordance with at least one preferred embodiment of the present invention, for each system, two types of statistical models of each N-best list 106 are generated. This modeling is separate from the modeling that is done of the acoustic properties in the speech signal. In fact, such acoustic models 120 are preferably used in order to generate the scores (at 118) in the N-best lists.

Figure 3:
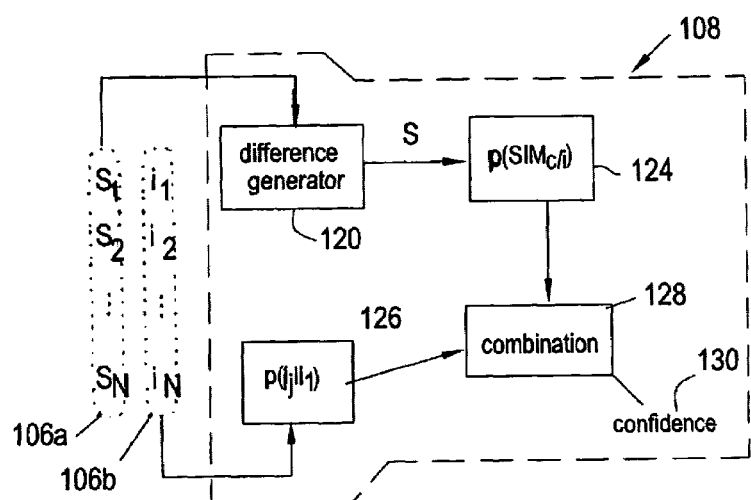
FIG. 3 schematically illustrates N-best list likelihood evaluation in the context of FIG. 1.

Once the aforementioned two N-best list models are present, it is possible to evaluate the likelihood of the observed N-best lists with respect to both and incorporate the results in a procedure to evaluate the confidence in the top candidate (108 in FIG. 1). Reference may now be made to FIG. 3, which illustrates an N-best list being split into two models (124/126) inherent in a confidence scoring arrangement such as that indicated in FIG. 1 at 108.

Mathematically:

Let $s_1, s_2, \ldots, s_N$ (indicated at 106a) be the top N scores (s1 is the best score).

Let $s = \{s_1-s_2, s_2-s_3, \ldots, s_{N-1}-s_N\}$ (the set of differences, preferably via a difference generator 120).

Let $i = i_1, i_2, \ldots, i_N$ (indicated at 106b) be the N identities (arranged in order from best to worst).

Training is preferably accomplished with development data in the form of the candidate and score lists of a large set of trails (i.e., examples of 106a/b during real usage of the system, or "development data") where the lists are each split into two sets according to whether the top candidate is correct or incorrect. Note that this partition depends on the output of the identification system. Thus, one will be learning the properties of the (acoustic) system output. The two N-best list models are preferably generated as discussed herebelow.

First, the set of development score difference vectors corresponding to the correct trials are preferably denoted $\{s\}$ correct and that of the incorrect trials is $\{s\}$ incorrect.

Next, one may preferably:

construct a statistical model of $\{s\}$correct=$M_{correct}$; and construct a statistical model of $\{s\}$incorrect=$M_{incorrect}$.

One can model each class (correct, incorrect) for example, as a Gaussian Mixture Model (GMM) (see Reynolds et al., supra); this is just one of many possibilities. In this case, the likelihood ratio would be used for the scoring of an observed N-best list, namely, the ratio of the likelihood with respect to $M_{correct}$ and likelihood with respect to $M_{incorrect}$:

$$\text{likelihood ratio} = p(\{s|M_{correct}\})/p(\{s|M_{incorrect}\})$$

where $p(\{s\}|M)$ are the Gaussian densities. This ratio (and generation thereof) is schematically indicated at 124 in FIG. 3.

Next, with the second model, one will preferably estimate the likelihood of the actual identities in the N-best list. That is, for each enrolled speaker the objective is to be able to evaluate the likelihood of any given sequence of identities in the N-best list for a test trial with the speaker's data. Thus, using the training data for each speaker, one will construct a model of the composition of $\{i\}$ correct for each speaker as follows:

Given a target $m_t$, for every model m in the enrolled population, estimate the probability that m is in the N-best list of a trial for which $m_t$ is the correct answer. (This depends on N relative to the size of the total population and is a function of the average position of m in the ordered list of candidates for the training trials.)

For each development trial of each speaker, consider the Np-best list (i.e. the ordered list of all of the identities and scores). Each enrolled model m has a position in this list. Preferably, the average position over all of the development trials for a given speaker will be computed. This average position can be interpreted as a "distance" to the top position. The position distribution of m is then preferably modeled with a Gaussian with mean and variance given by the average position and deviation from the development trials. Thus, for each pair of enrolled speakers, there will be a probability density for the position of one speaker in the other's N-best list. For testing, one may assume independence and use the product model to evaluate the probability of the N-best list identities conditional on the top candidate being correct; thus:

$$\text{likelihood} \approx \prod_{i=2}^{N} p(i_j|i_1)$$

where $p(i_j|i_1)$ is the aforementioned Gaussian density. (This quantity, and generation thereof, is schematically indicated at 126 in FIG. 3.)

Then, the two scores from (1) and (2) are preferably fused using Linear Discriminant Analysis (LDA), GMM, or a neural network model. (A good discussion of LDA and neural network models may be found in *Pattern Classification and Scene Analysis*, Duda and Hart, John Wiley & Sons, Inc. 1973.) This final score is the confidence measure. For concreteness, a linear combination (i.e. LDA) is preferably used (indicated at 128) to yield a confidence score (indicated at 130) as follows:

$$\text{confidence} = \alpha \cdot (\text{likelihood ratio}(1)) + \beta \cdot (\text{likelihood ratio}(2))$$

This confidence can be compared to a threshold t0, chosen so that a value less than t0 means that the system output for the trial should be considered inconclusive. In the broader framework, the speaker identification system may opt to collect more data from the individual and reevaluate the identities (step 116 in FIG. 1).

It is to be understood that the present invention, in accordance with at least one presently preferred embodiment, includes an arrangement for accepting input speech, an arrangement for generating at least one N-best list based on the input speech, an arrangement for positing a system output based on the input speech, and an arrangement for ascertaining, via at least one property of the N-best list, whether the posited system output is inconclusive. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for facilitating speaker identification, said apparatus comprising:

an arrangement for accepting input speech;

an arrangement for generating at least one N-best list based on the input speech;

an arrangement for positing a system output based on the input speech; and an arrangement for ascertaining, via at least one statistical property of the N-best list, whether the posited system output is inconclusive, wherein said ascertaining arrangement is adapted to generate at least two statistical models of the at least one N-best list in ascertaining whether the posited system output is inconclusive.

2. The apparatus according to claim 1, wherein said ascertaining arrangement is adapted to combine results from the at least two statistical models to yield a confidence measure in ascertaining whether the posited system output is inconclusive.

3. The apparatus according to claim 2, wherein said ascertaining arrangement is adapted to compare the confidence measure to a threshold value to determine whether the posited system output is inconclusive.

4. The apparatus according to claim 3, wherein said ascertaining arrangement is further adapted to prompt the collection of additional input speech from the same speaker and reevaluate whether a new posited system output relating to the additional input speech is inconclusive.

5. The apparatus according to claim 1, wherein one of said at least two statistical models relates to scores in the at least one N-best list.

6. The apparatus according to claim 5, wherein said one of said at least two statistical models involves the calculation of a ratio of Gaussian densities relating to scores in the at least one N-best list.

7. The apparatus according to claim 1, wherein one of said at least two statistical models relates to identities in the at least one N-best list.

8. The apparatus according to claim 7, wherein said one of said at least two statistical models involves the estimation of the likelihood of identities in the at least one N-best list.

9. A method of facilitating speaker identification, said method comprising the steps of:
accepting input speech;
generating at least one N-best list based on the input speech;
positing a system output based on the input speech; and
ascertaining, via at least one statistical property of the N-best list, whether the posited system output is inconclusive,
wherein said ascertaining step comprises generating at least two statistical models of the at least one N-best list in ascertaining whether the posited system output is inconclusive.

10. The method according to claim 9, wherein said ascertaining step comprises combining results from the at least two statistical models to yield a confidence measure in ascertaining whether the posited system output is inconclusive.

11. The method according to claim 10, wherein said ascertaining step comprises comparing the confidence measure to a threshold value to determine whether the posited system output is inconclusive.

12. The method according to claim 11, wherein said ascertaining step comprises prompting the collection of additional input speech from the same speaker and reevaluating whether a new posited system output relating to the additional input speech is inconclusive.

13. The method according to claim 9, wherein one of said at least two statistical models relates to scores in the at least one N-best list.

14. The method according to claim 13, wherein said one of said at least two statistical models involves the calculation of a ratio of Gaussian densities relating to scores in the at least one N-best list.

15. The method according to claim 9, wherein one of said at least two statistical models relates to identities in the at least one N-best list.

16. The method according to claim 15, wherein said one of said at least two statistical models involves the estimation of the likelihood of identities in the at least one N-best list.

17. A program storage device readable by machine, tangibly embodying a program of instructions executable by the machine to perform method steps for facilitating speaker identification, said method comprising the steps of:
accepting input speech;
generating at least one N-best list based on the input speech;
positing a system output based on the input speech; and
ascertaining, via at least one statistical property of the N-best list, whether the posited system output is inconclusive,
wherein said ascertaining step comprises generating at least two statistical models of the at least one N-best list in ascertaining whether the posited system output is inconclusive.

* * * * *